(12) United States Patent
Santos

(10) Patent No.: US 7,290,799 B2
(45) Date of Patent: Nov. 6, 2007

(54) DISPOSITION INTRODUCED TO HYDROPNEUMATIC JACK

(76) Inventor: Vitor Hugo Duarte Santos, Rua Placido de Castro No. 1094, Apt. 202, Caxias do Sul (BR) 95084-370

( * ) Notice: Subject to any disclaimer, the term of this patent is extended or adjusted under 35 U.S.C. 154(b) by 143 days.

(21) Appl. No.: 11/225,037

(22) Filed: Sep. 14, 2005

(65) Prior Publication Data
US 2006/0108748 A1 May 25, 2006

(30) Foreign Application Priority Data
Nov. 25, 2004 (BR) .................. 8402864 U

(51) Int. Cl.
*B66F 3/24* (2006.01)
(52) U.S. Cl. .............. 280/766.1; 280/762; 280/54.1; 280/764.14; 280/763.1; 254/423; 254/418; 254/419; 254/420
(58) Field of Classification Search ......... 280/766.1, 280/763.1, 762, 54.1, 764.1; 254/423, 418, 254/419, 420; D34/31; 29/402.08
See application file for complete search history.

(56) References Cited

U.S. PATENT DOCUMENTS

| | | | | |
|---|---|---|---|---|
| 4,061,309 A | * | 12/1977 | Hanser | 254/423 |
| 4,746,133 A | * | 5/1988 | Hanser et al. | 280/6.153 |
| 4,993,688 A | * | 2/1991 | Mueller et al. | 254/423 |
| 5,219,429 A | * | 6/1993 | Shelton | 254/423 |
| 5,722,641 A | * | 3/1998 | Martin et al. | 254/423 |
| 6,027,295 A | * | 2/2000 | Geppert et al. | 414/12 |
| 6,145,813 A | * | 11/2000 | Anderson | 254/418 |
| 6,895,648 B1 | * | 5/2005 | Willett | 29/402.08 |
| 6,896,289 B2 | * | 5/2005 | Gross | 280/766.1 |
| 6,913,248 B1 | * | 7/2005 | Schmitz | 254/423 |

\* cited by examiner

*Primary Examiner*—Christopher P. Ellis
*Assistant Examiner*—Cynthia F. Collado
(74) *Attorney, Agent, or Firm*—Sughrue Mion, PLLC

(57) ABSTRACT

"DISPOSITION INTRODUCED TO HYDROPNEUMATIC JACK", according to description of the report and the annexed illustrations, it is about a new disposition for a hydropneumatic device that is used to lift and support hauler and semi-haulers, whereby the device was designed to offer more operational easiness to the driver through the increase of speed, as well as the durability of the set.

1 Claim, 8 Drawing Sheets

Detalhe B

_(2)_

DISPOSITION INTRODUCED TO HYDROPNEUMATIC JACK

BACKGROUND OF THE INVENTION

This patent for the Utility Model refers to a new disposition that was introduced to a hydropneumatic device which is used to lift and support haulers and semi-haulers, whereby such device has been projected to offer more easiness to the driver during operations through the increase of speed, as well as durability in the set.

The state of the technique, which is the reason for this perfected construction, is known by means of patents MU 8201270-9 and MU 8203002-2, from the same petitioner.

Patent MU 8201270-9 refers to a hydraulic lifting device for haulers and semi-haulers that is composed of a squared structure in steel, fixed by means of screws at the front of a semi-hauler, which supports the implement and also helps in its elevation, facilitating the coupling or uncoupling of a towing vehicle; it consists of a independent reservoir for hydraulic oil on each device, on both the left and right sides of the hauler or semi-hauler, operated by means of a lever that activates an eccentric shaft when it is turned, thus resulting into descendent vertical movement in the mechanical hydraulic injector which is operated manually, which in turn dislocates a volume of oil that has been determined for the bottom of the hydraulic cylinder, dislocating then the inner casing of the levering equipment. The return of the hydraulic injector and the shaft for the cylinder is performed by means of compression springs and worm gear traction. Therefore, it is a manually operated system that depends upon human propulsion.

In a different fashion, Patent MU 8203002-2 consists of a form of an automated hydraulic lifting device for haulers and semi-haulers, that is to say, it is provided with a continuous pneumatic pump and the operation is made by means of an air compressor coming from the towing vehicle. The hydropneumatic operation produces the telescopic movement in the hydraulic cylinder and the consequential descending movement of the telescopic boom. The return to the hydraulic cylinder and lifting of the telescopic boom occurs by the entry of air in the cylinder and the reestablishment of the inner air pressure. Therefore, it is an automated system that uses a continuous pneumatic pump and air compression, and no longer human propulsion and worm gear traction which present low durability due to wear as a result of the movement.

SUMMARY OF THE INVENTION

This Disposition Introduced to Pneumatic Jack maintains the principal operating characteristics as the aforementioned models, as well as proposing practical improvements; its basics reside in the inventive concept of functional and manufacturing improvement in regard to technical state of the object.

Therefore, this object was developed from difficulties that were already present in previous models, mainly for those that referred to operating time, maintenance of the elements of the set, and the manufacturing difficulty which consequently means more expenses.

Thereby an automation improvement was developed that is operated through the air compressor that comes from the towing vehicle, acting on the reservoir for hydraulic oil, and furthermore containing more efficient constructive elements and an easier manufacturing and maintenance process, such as the valve control and the cartridge valve.

Advantages:

This proposal for the new Disposition Introduced to Hydropneumatic Jack has the following advantages:

Faster lifting movement provided by the pressure that is applied on two spots: the continuous pneumatic pump and the reservoir for the hydraulic oil.

Ease in the maintenance acquired by the presence of the cartridge valve whose function is to transmit pressure to the hydraulic oil. This function was performed directly by the continuous pneumatic pump, which resulted in loss of pressure. Now, with the cartridge valve, small damages can be solved by replacing only one valve;

Greater easiness to manufacture the valve command for there was a representative decrease of holes and elements to be performed;

More functionality and practicality of the hydropneumatic jack which underwent an improvement of its operation, and is now equipped with maintenance easiness and lower cost.

Aiming to facilitate the research and offer an understanding of this patent, and as announced in the report, according to the basic and preferential manner of realization as elaborated by the petitioner, reference is made to annexed illustrations which integrate and subsidize this description, wherein:

DETAILED DESCRIPTION OF THE INVENTION

Figure 1:
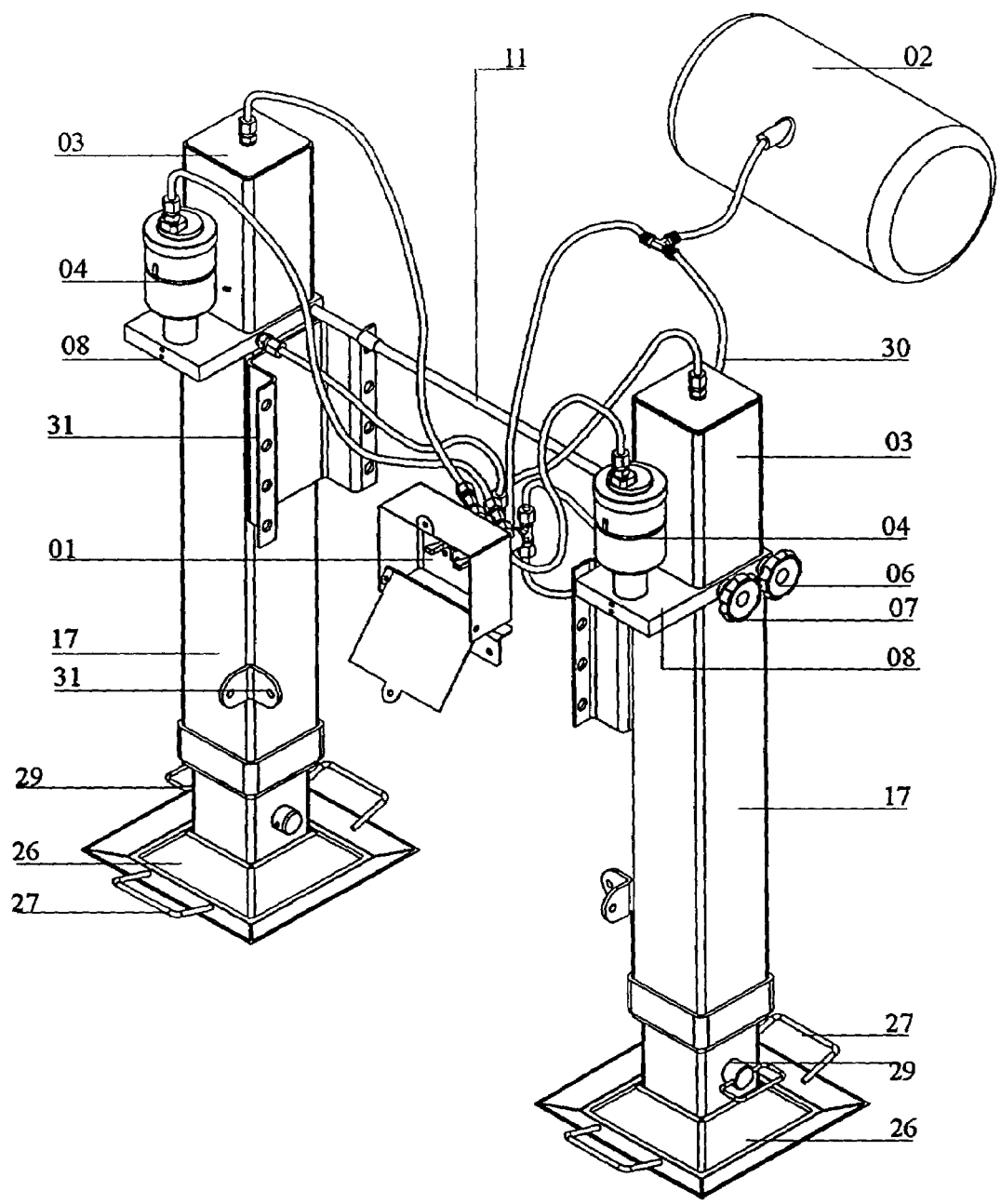
FIG. 1—Presents a view of the perspective altogether—left and right sides.
Figure 2:
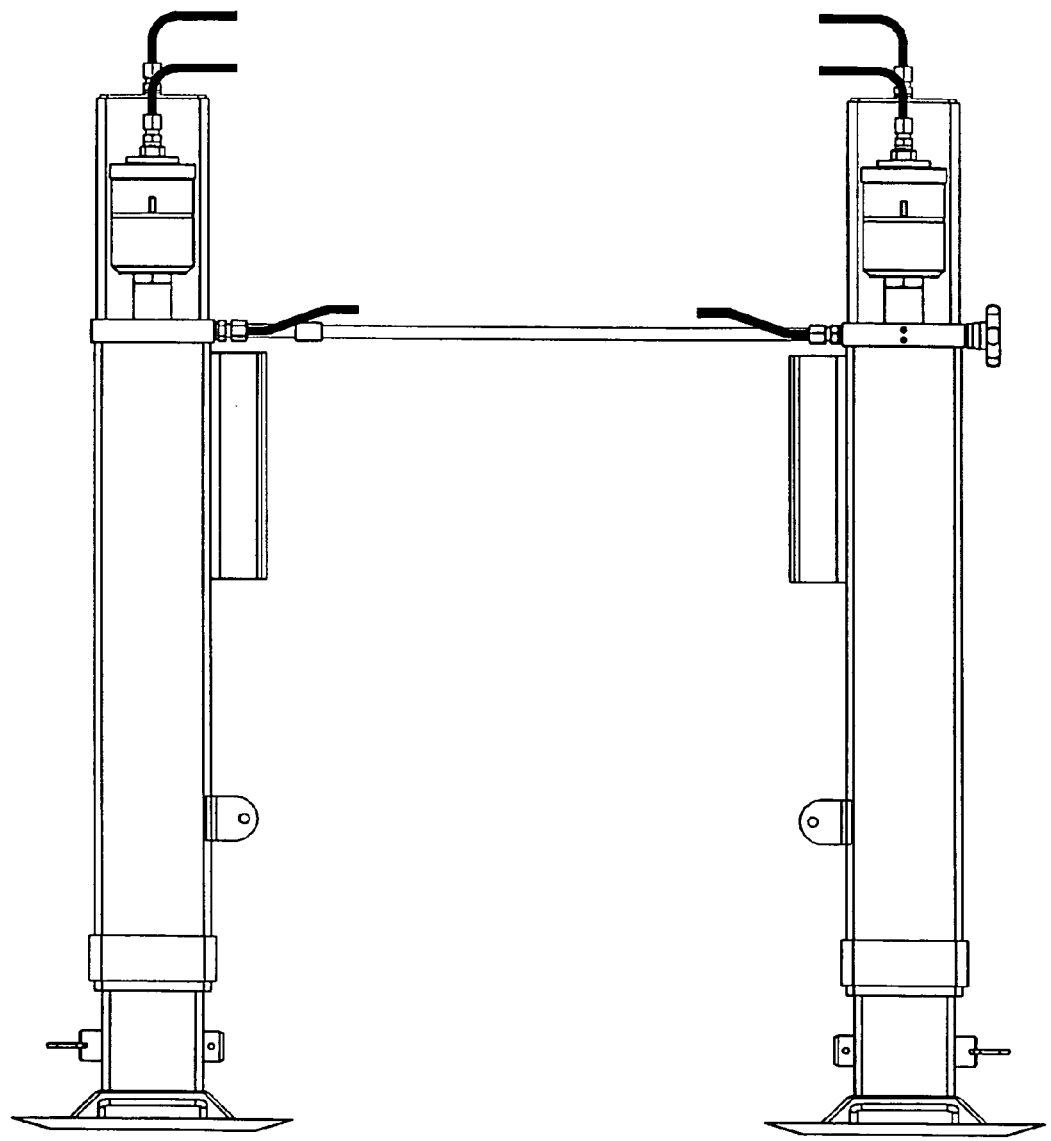
FIG. 2—presents a frontal view of the set.
Figure 3:
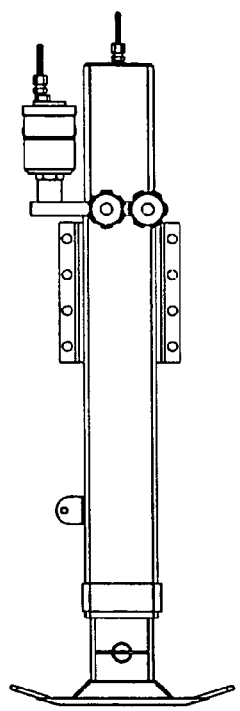
FIG. 3—presents a lateral view of the set.
Figure 4:
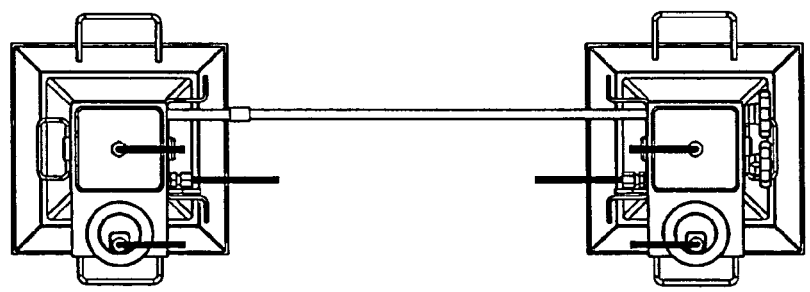
FIG. 4—presents an upper view of the set.
Figure 5:
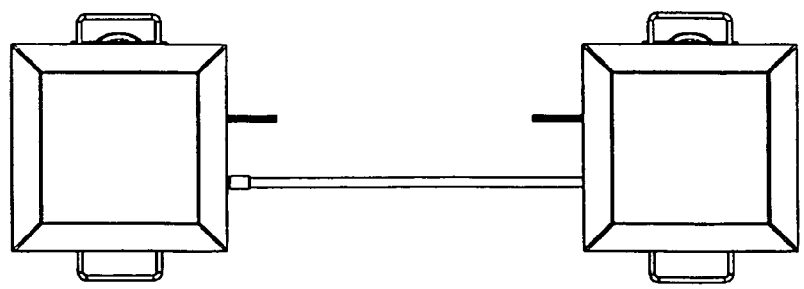
FIG. 5—presents a lower view of the set.
Figure 6:
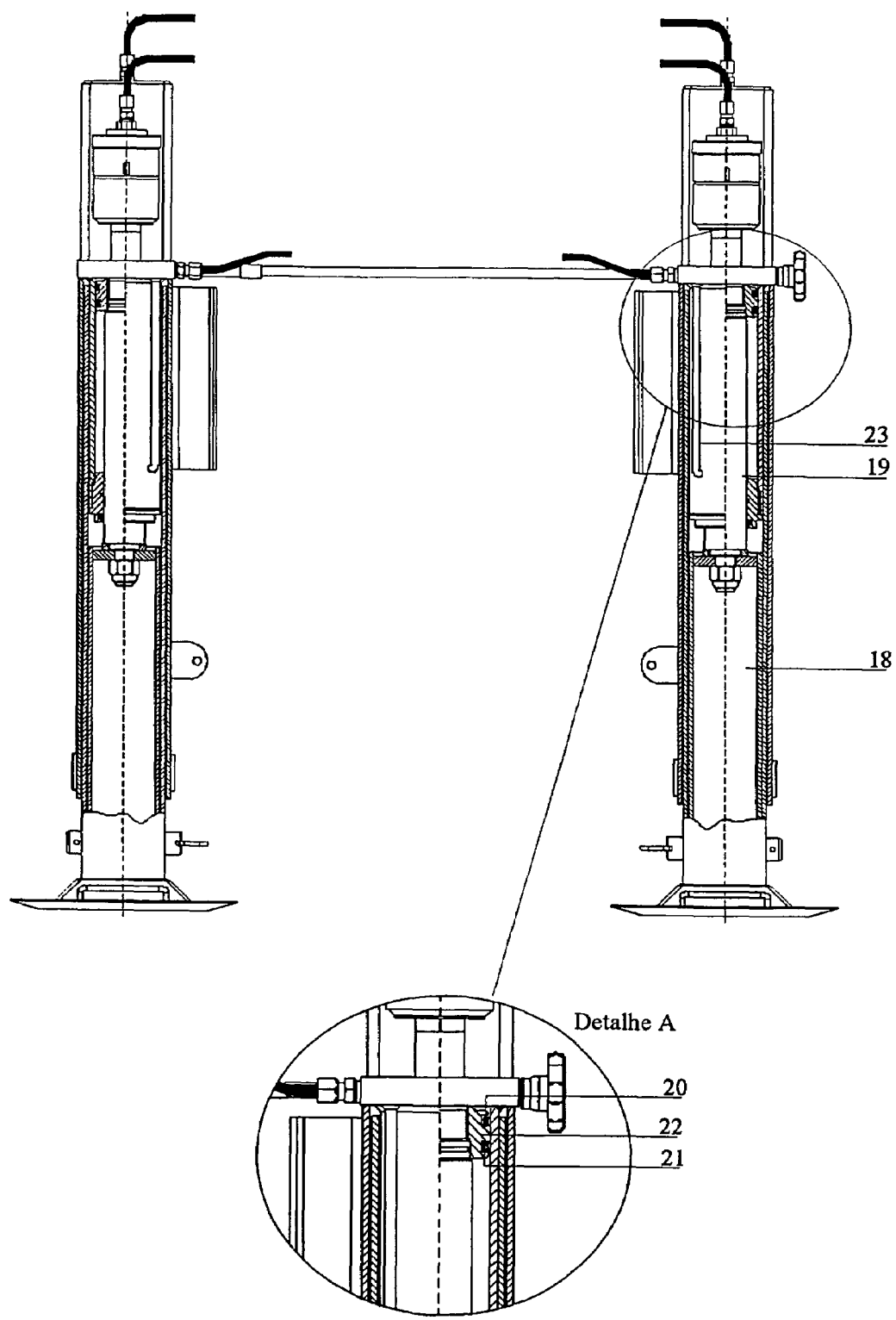
FIG. 6—presents a cut of the telescopic boom before the hydraulic cylinder moves in Detail A.
Figure 7:
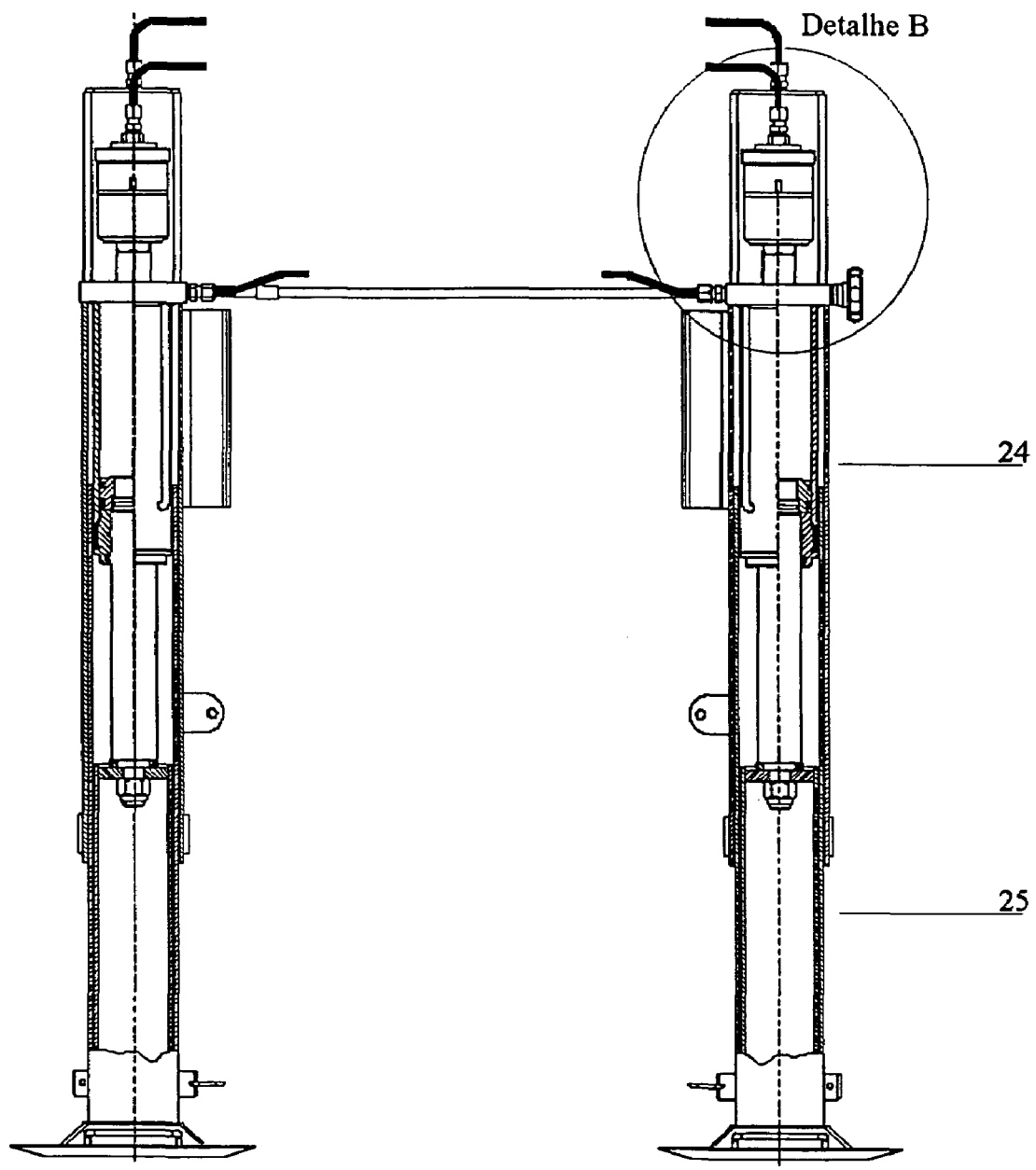
FIG. 7—presents a cut of the telescopic boom after the hydraulic cylinder moves.
Figure 8:
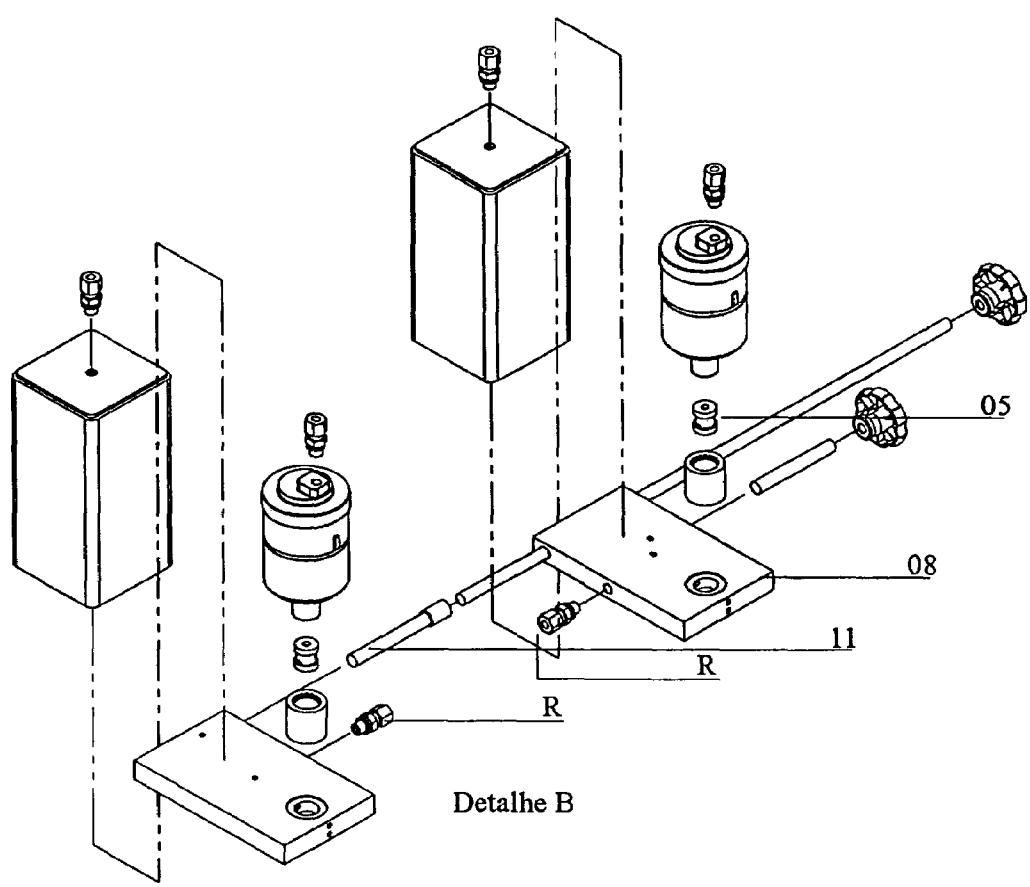
FIG. 8 presents an augmented view showing the perspective of Detail B and the left and right sides.
Figure 9A:
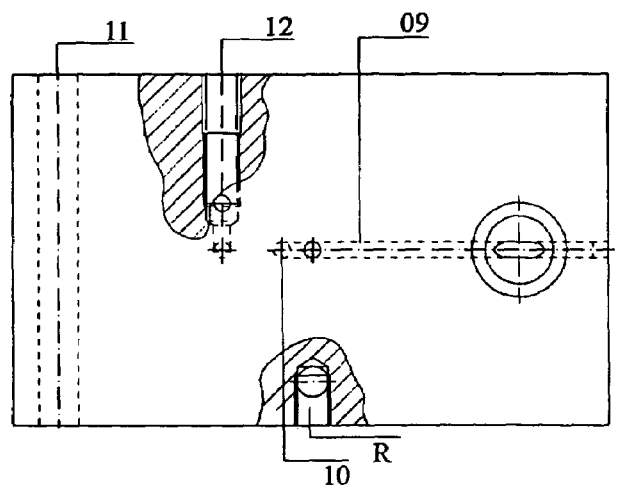
FIG. 9—presents transversal and longitudinal cuts of the valve control—left and right sides.
Figure 9B:
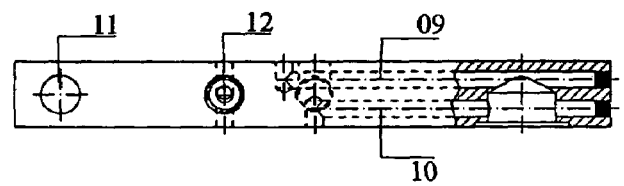
Figure 9C:
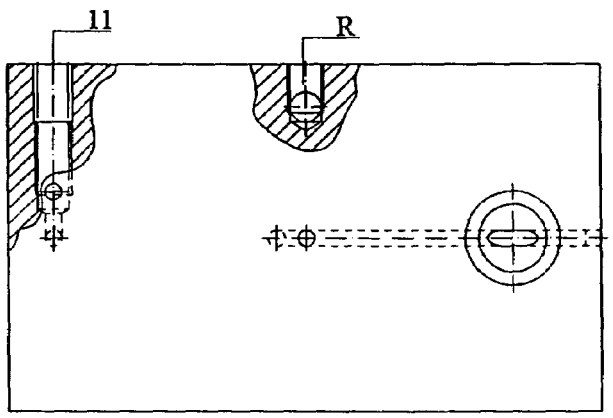
Figure 9D:
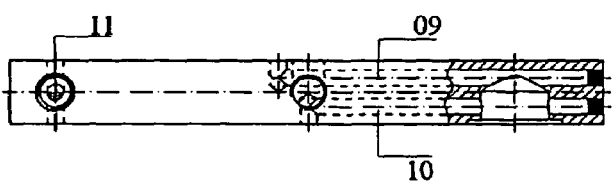
Figure 10:
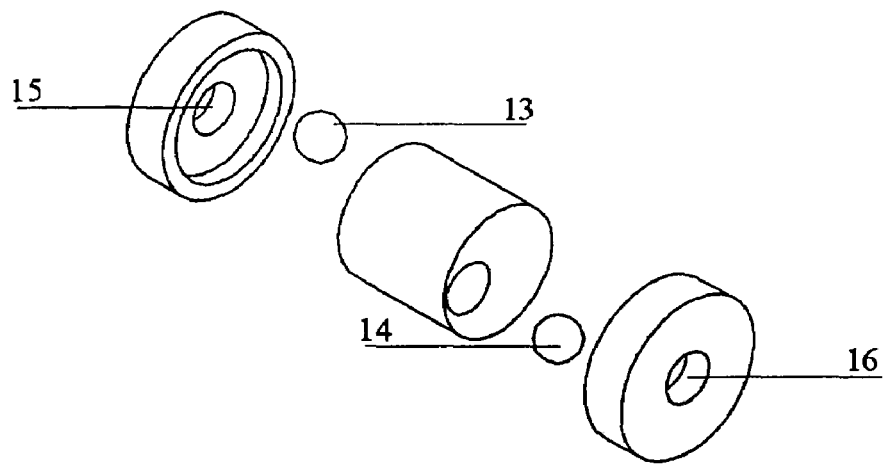
FIG. 10—presents an augmented view of the cartridge valve.
Figure 11:
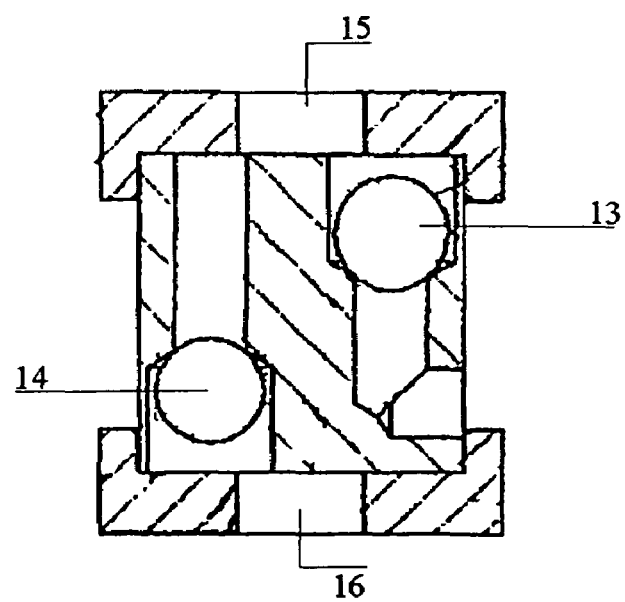
FIG. 11—presents a cut of the cartridge valve.

As it can be verified through the presentation of the figures, the aim of this patent is composed by the control key (01) that releases compressed air from the reservoir in the towing vehicle (02) and puts pressure over the hydraulic reservoir (03) and over the continuous pneumatic pump (04).

Underneath the continuous pneumatic pump (04) the cartridge valve (05), gloves (06) and (07), and valve control (08) can be all seen, having connection to descend the oil (10) to the entry (09), supply of air (11) and (12) and the return of the air to the system (R). The cartridge valve (05) is composed by the spheres (13) and (14), and the orifices (15) and (16), and the entry and exit for oil, respectively.

The telescopic boom (17) is made internally by the inner casing (18), a piston (19), hydraulic gaskets (20), pneumatic gaskets (21), a plunger (22) and an air entry (23) for the return of the piston. Externally, the telescopic boom (17)

contains an upper (24) and a lower solution (25), and is composed by a regular base (26) that has handles (27), openings (28) to couple the screws (29), apart from the hoses (30) and fastening elements (31).

Operation:

This patent is put to work in the following manner:

To raise the telescopic boom (17), the control key is switched on (01), which in turn releases compressed air from the cylinder applying thus pressure over the reservoir for the hydraulic oil (03) and over the continuous pneumatic pump (04). The pressure applied to the reservoir (03) and over the pump (04) makes the oil run through the entry (09) going through the cartridge valve (05), and brought directly into the inner casing (18) and likewise apply pressure on the piston (19), which in turn will lift the upper part of the telescopic boom (17) up to the desired height. The control key (01) is then disconnected, and the set with the bolt (29) is unlocked on the left and right sides.

For the return of the telescopic boom (17), the bolts are unlocked (29), the gloves (06) and (07) are simultaneously turned counterclockwise, which releases the return of air to the system and the subsequent piston (19) return of the inner casing (18) back to its original position.

CONCLUSION

Thus, the Disposition Introduced in the Hydropneumatic Jack is supported by unprecedented technical and functional characteristics as can be verified in the annexed figures, and understood from descriptive report, having thus earned the requested legal protection.

What is claimed is:

1. A hydropnuematic jack, comprising:
    a control key that releases compressed air from a reservoir in a towing vehicle;
    a reservoir for hydraulic oil;
    a continuous pneumatic pump;
    hoses;
    a control valve that controls the reservoir for the hydraulic oil and the continuous pneumatic pump, the control valve comprising a cartridge valve and handles; and
    a telescopic boom comprising upper and lower portions, a base, openings that couple screws, and a fastening element, wherein an internal structure of the telescopic boom comprises an inner casing, a piston, hydraulic gaskets, a plunger, and an air entry;
    wherein the compressed air applies pressure over the reservoir for the hydraulic oil and over the continuous pneumatic pump,
    the control valve comprises an entry for descent of the oil, an air entry, and a return system, and
    the cartridge valve comprises spheres and orifices that provide entry and exit of the oil.

* * * * *